(12) United States Patent
DeMichiel et al.

(10) Patent No.: US 6,389,425 B1
(45) Date of Patent: May 14, 2002

(54) EMBEDDED STORAGE MECHANISM FOR STRUCTURED DATA TYPES

(75) Inventors: Linda Gail DeMichiel, Los Altos; Gene Y. C. Fuh, San Jose; Bruce Gilbert Lindsay, San Jose; Nelson Mendonca Mattos, San Jose; Brian Thinh-Vinh Tran, San Jose; Yun Wang, Saratoga, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/112,464

(22) Filed: Jul. 9, 1998

(51) Int. Cl.$^7$ ................................................ G06F 17/30
(52) U.S. Cl. ........................... 707/102; 707/2; 707/3; 707/103
(58) Field of Search ................................ 707/102, 103, 707/1, 2, 3, 5, 100; 709/315, 316; 395/705; 717/5

(56) References Cited

U.S. PATENT DOCUMENTS

| | | | |
|---|---|---|---|
| 4,531,186 A | 7/1985 | Knapman ..................... | 707/5 |
| 4,841,433 A | 6/1989 | Hakim et al. ................. | 703/3 |
| 5,043,872 A | 8/1991 | Cheng et al. ................. | 707/2 |
| 5,299,123 A | 3/1994 | Wang et al. .................. | 707/2 |
| 5,327,543 A | 7/1994 | Miura et al. ................ | 712/224 |
| 5,404,510 A | 4/1995 | Smith et al. ................. | 707/2 |
| 5,454,039 A | 9/1995 | Coppersmith et al. ........ | 380/28 |
| 5,544,357 A | 8/1996 | Huei ............................ | 707/2 |
| 5,546,576 A | 8/1996 | Cochrane et al. ........... | 707/104 |

(List continued on next page.)

FOREIGN PATENT DOCUMENTS

DE          0 650 131 A1     4/1995

OTHER PUBLICATIONS

IEEE publication, "A Practical and Space Efficient Scheme For Keeping Source Code Location in Parse Trees", by Jianhua Zhu, U.S. West Advanced Technologies, Boulder Colorado, pp. 374–379, Nov. 1993.*
IEEE publication, "Modeling and Querying Structure and Contents of the Web" by Wolfgang May, Institute fuer Informatik, Universitaet Frieburg, Germany, pp. 721–725, Nov. 1993.*
"Heirarchical Data Model for a Relational Database based Geographic Information System", *IBM® Technical Disclosure Bulletin*, 40(03):107–116 (Mar. 1997).
Lynch, C. et al., "Extended User—Defined Indexing with Application to Textual Databases", Proceedings of the 14th VLDB Conference, pp. 306–317 (1988).
Rudolf Bayer, "The Universal B—Tree for Multidimensional Indexing: General Concepts", Worldwide Computing and Its Applications, International Conference, WWCA '97, Tsukuba, Japan, (Mar. 1997). pp. 198–209.
Faloutsos, C. et al., "Fast Map: A Fast Algorithm for Indexing, Data—Mining and Visualization of Traditional and Multimedia Datasets", Proc. of ACM SIGMOD, pp. 163–174 (May 1995).

(List continued on next page.)

*Primary Examiner*—Diane D. Mizrahi
(74) *Attorney, Agent, or Firm*—Sughrue Mion, PLLC

(57) ABSTRACT

A method, apparatus, and article of manufacture for a computer-implemented embedded storage mechanism for structured data types. A statement is stored in a database stored on a data storage device connected to a computer. At compile-time, specific methods for a structured data type are mapped to generic methods using parse trees. At run-time, an in-memory representation of the structured data type is generated using information conveyed in the parse trees. Then, linearization of the generated in-memory representation is performed.

18 Claims, 20 Drawing Sheets

U.S. PATENT DOCUMENTS

| | | | | |
|---|---|---|---|---|
| 5,553,281 | A | | 9/1996 | Brown et al. ............... 707/104 |
| 5,590,325 | A | | 12/1996 | Kolton et al. ............... 707/104 |
| 5,604,892 | A | | 2/1997 | Nuttall et al. .................. 703/18 |
| 5,608,904 | A | | 3/1997 | Chaudhuri et al. ............ 707/2 |
| 5,619,692 | A | | 4/1997 | Malkemus et al. ............ 707/2 |
| 5,630,125 | A | | 5/1997 | Zellweger ................... 707/103 |
| 5,630,127 | A | | 5/1997 | Moore et al. ............... 707/104 |
| 5,857,182 | A | * | 1/1999 | DeMichiel et al. ............ 707/3 |
| 6,061,678 | A | * | 5/2000 | Klein et al. ..................... 707/3 |
| 6,065,013 | A | * | 5/2000 | Fuh et al. ................... 707/103 |

OTHER PUBLICATIONS

Ouksel, M. et al., "Multidimensional B—trees: Analysis of Dynamic Behavior", Dept. of Elec. Eng. and Computer Science, Northwestern Univ., Evanston, Ill., BIT 21, pp. 401–418 (1981).

Klaus, F. et al., "Flexible, Runtime Efficient Fector—Radix Algorithms For Multidimensional Fast Fourier Transform", SPIE, vol. 2247, Sensors and Control for Automation, pp. 216–226 (1994).

Sang, K.S. et al., "Applicability of genetic algorithms to optimal evaluation of path predicates in object—oriented queries", Information Processing Letters, vol. 58, No. 3, 123–128 (abstract), (May 1996).

Byungwook, K. et al., "A new indexing scheme supporting multi–attribute database applications: MAX", Journal of Systems Architecture, vol. 42, No. 2, (abstract), (Sep. 1996). p. 1.

Silberschatz, A. et al., "Managing Class Types", SPI Database of Software Technologies, 6 pages, (May 1977).

Scheuermann, P. et al., "Multidimensional B—Trees For Associative Searching In Database Systems", Inform. Systems, vol. 7, No. 2, pp. 123–137 (1982).

* cited by examiner

EMBEDDED STORAGE MECHANISM FOR STRUCTURED DATA TYPES

BACKGROUND OF THE INVENTION

1. Field of the Invention

This invention relates in general to computer-implemented database systems, and, in particular, to an embedded storage mechanism for structured data types.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

Traditionally, a RDBMS stores simple data, such as numeric and text data. In a traditional RDBMS, the underlying storage management has been optimized for simple data. More specifically, the size of a record is limited by the size of a data page, which is a fixed number (e.g., 4 K) defined by a computer developer. This restriction in turn poses a limitation on the length of data in columns of a table. To alleviate such a restriction, most computer developers today support a new built-in data type for storing large objects (LOBs). Large object types include audio, video, image, text, spatial data (e.g., shape, point, line, polygon, etc.), time series data, OLE documents, Java objects, C++ objects, etc. Large objects typically take up a great deal of storage space. However, the access time for LOB object data is significantly slower than that of simple data types. This occurs because the LOB object data is accessed through a LOB descriptor stored in a record buffer and requires an extra input/output (I/O) access of a database. In many applications, where the average size of an object is typically much smaller than the largest size of the object, using a LOB descriptor is the only way to store object data, but storage comes at the cost of performance. This problem also applies to structured object types, such as abstract data types, arrays, lists, sets, etc.

In some conventional systems, when a column is defined for data of a structured data type, the conventional system stores a token in the column that refers to another table, which contains a column for each attribute of the structured data type. However, if a user wants to store data in that column having more attributes, the conventional system does not have a simple and efficient technique for storing that data in the column.

Moreover, conventional systems are not adequate for handling storage for structured data types for user-defined data. Therefore, there is a need in the art for an improved embedded storage mechanism for structured data types.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented embedded storage mechanism for structured data types.

In accordance with the present invention, A statement is stored in a database stored on a data storage device connected to a computer. At compile-time, specific methods for a structured data type are mapped to generic methods using parse trees. At run-time, an in-memory representation of the structured data type is generated using the information conveyed in the parse trees. Then, linearization of the generated in-memory representation is performed.

An object of the invention is to provide substitutability for columns defined with structured data types. Another object of the invention is to provide extensibility of a type hierarchy.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
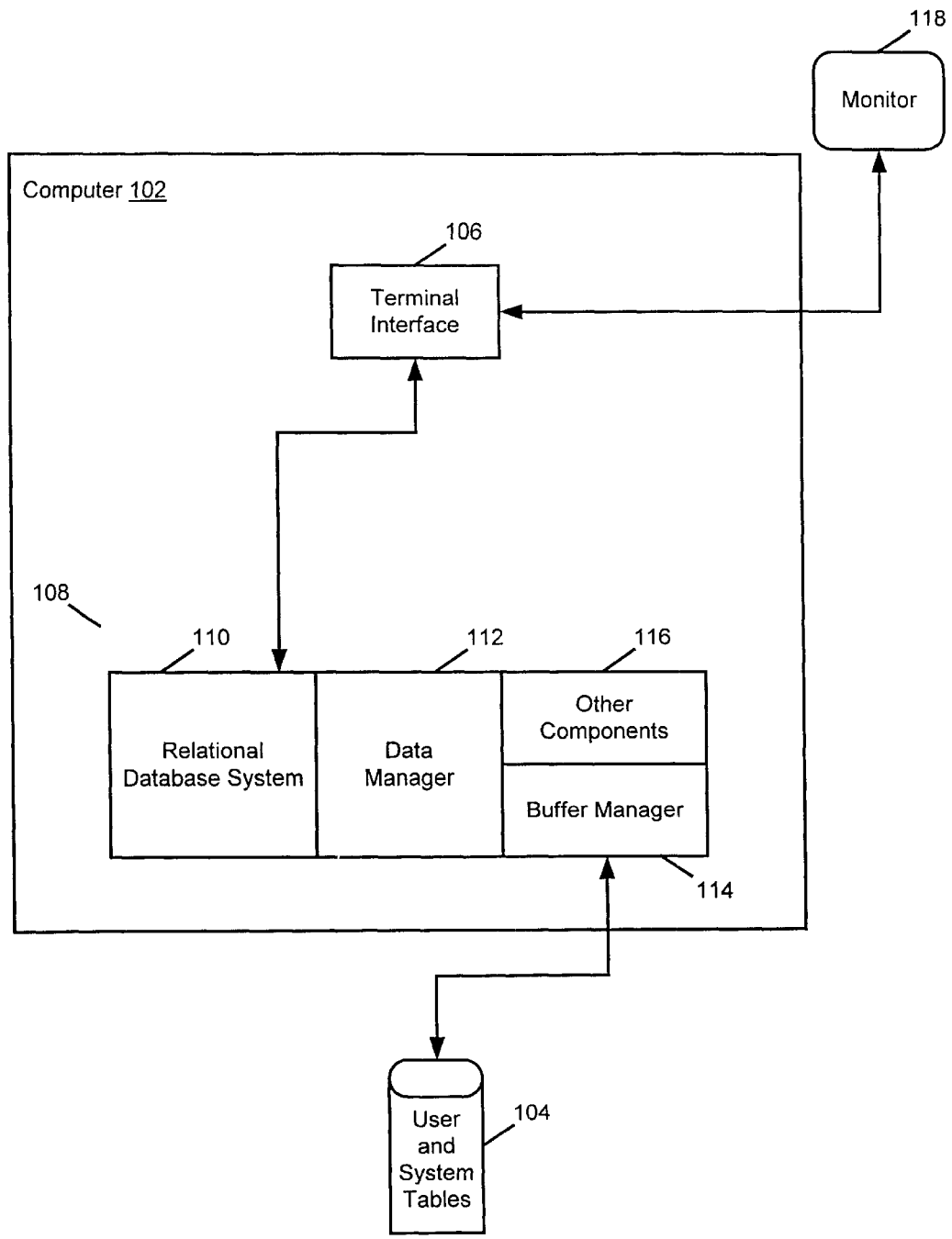
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104, such as a fixed or hard disk drive, a floppy disk drive, a CDROM drive, a tape drive, or other device, that store one or more relational databases.

Operators of the computer system 102 use a standard operator interface 106, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the AIX® operating system. Those skilled in the art will recognize, however, that the present invention has application to any RDBMS software, whether or not the RDBMS software uses SQL.

At the center of the DB2® system is the Database Services module 108. The Database Services module 108 contains several submodules, including the Relational Database System (RDS) 110, the Data Manager 112, the Buffer Manager 114, and other components 116 such as an SQL compiler/interpreter. These submodules support the functions of the SQL language, i.e. definition, access control, interpretation, compilation, database retrieval, and update of user and system data.

The present invention is generally implemented using SQL statements executed under the control of the Database Services module 108. The Database Services module 108 retrieves or receives the SQL statements, wherein the SQL statements are generally stored in a text file on the data storage devices 104 or are interactively entered into the computer system 102 by an operator sitting at a monitor 118 via operator interface 106. The Database Services module 108 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
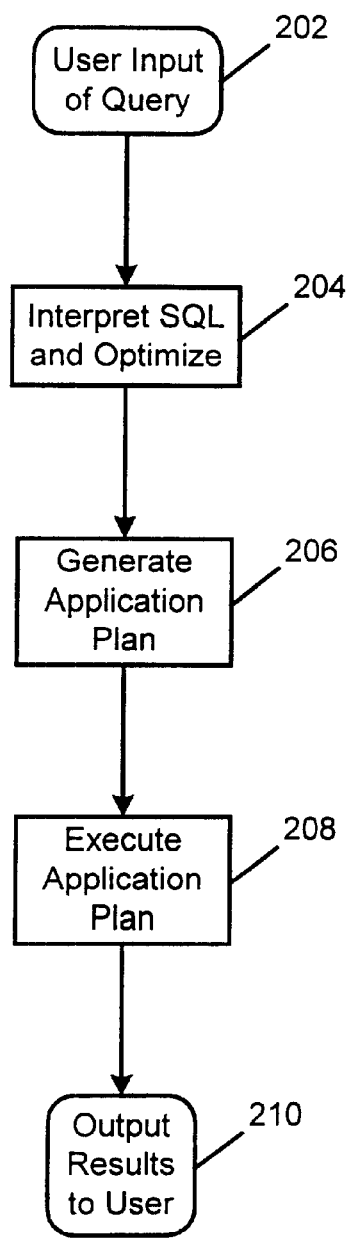
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102 from the user. Block 204 represents the step of compiling or interpreting the SQL statements. An optimization function within block 204 may optimize the SQL. Block 206 represents the step of generating a compiled set of run-time structures called an application plan from the compiled SQL statements. Generally, the SQL statements received as input from the user specify only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results of the application plan to the user.

Figure 3:
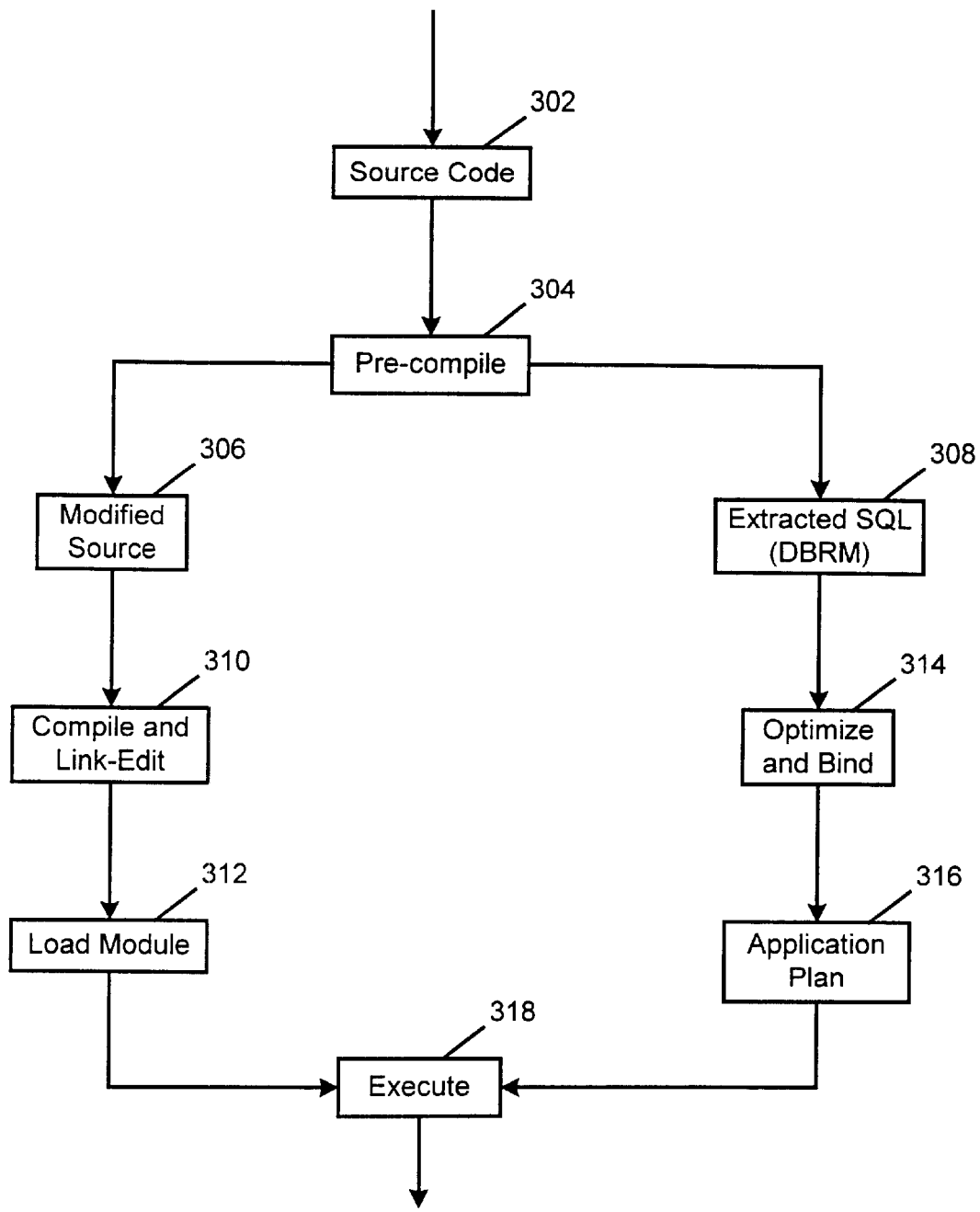
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to DB2, which the pre-compile step 304 inserts in place of SQL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of run-time structures for the application plan 316. As indicated above in conjunction with FIG. 2, the SQL statements from the program source code 302 specify only the data that the user wants, but not how to get to it. The optimize and bind step 314 may reorder the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

An Embedded storage mechanism For Structured Data Types

The present invention provides an embedded storage mechanism for structured data types. The embedded storage mechanism is part of the RDBMS 110. The embedded storage mechanism provides substitutionability and extensibility of type hierarchies.

In particular, a column of a table may be defined using a first structured data type (e.g., geometry). Later, a user may want to put data into the column that is of a second structured data type (e.g., polygon), which builds on and inherits the attributes of the first structured data type (e.g., geometry). The embedded storage mechanism is able to store either data of either type in the column. Additionally, extensibility is used to refer to the process of building on the first structured data type to generate the second structured data type, to build a third structured data type that builds on the second structured data type, etc.

Again, the embedded storage mechanism not only allows a user to "extend" types in this manner, but also enables any type of data that is based on the type that is defined for a column to be stored in that column. This is especially advantageous because a user may define data to be stored in a column using a second structured data type, with any number of attributes, that builds on a first structured data type after a column of a table has been defined using the first structured data type.

The embedded storage mechanism is able to provide substitutionability and extensibility by its compile-time processing, run-time in-memory representation of data, and run-time linearization. During compile-time processing, the embedded storage mechanism maps specific functions (e.g., constructor, copy constructor, mutator, and observer) to generic functions using parse trees. During run-time processing, the embedded storage mechanism uses the information conveyed in the parse trees to generate an in-memory representation of data. Additionally, during run-time processing, the embedded storage mechanism performs linearization to convert the in-memory representation of data into a linear format that is understood by the RDBMS 110.

Overview of Abstract Data Types

An abstract data type (ADT) object is a compound object that can include audio, video, image, text, spatial data (e.g., shape, point, line, polygon, etc.), time series data, OLE documents, Java objects, C++ objects, etc. along with meta information about the objects. Additionally, an abstract data type (ADT) is a type mechanism for modeling and storing complex objects inside of a relational database engine. Conventional types include integer, character, and floating point. When an ADT is defined, a variable can be defined of that type. The variable then has the structure of the defined ADT.

In the SQL language, host types include ADT structures and ADT locators. SQL types include user-defined structured types, an arbitrary number of attributes, and nested ADT objects. Additionally, SQL types provide for inheritance, either where all objects inherit attributes from one or more super-types or where objects can inherit attributes from multiple other objects (i.e., multiple inheritance). SQL types can be instantiable, in which case the object can be instantiated, or uninstantiable, in which case an object cannot be instantiated from the type. When a type is uninstantiable, typically instantiable sub-types are derived from that uninstantiable type.

The following is an example ADT called geometry:

| CREATE ADT geometry | (gtype char (1), area float, length float, xmin float, ymin float, xmax float, ymax float, numOfParts int, numOfPoints int, points blob (1M); |
|---|---|

The CREATE ADT geometry statement creates an abstract data type called geometry. The geometry ADT has the following parameters: gtype of type character, area of type float, length of type float, xmin of type float, ymin of type float, xmax of type float, ymax of type float, numOfParts of type integer, and points of type blob (i.e., binary large object).

The following example illustrates an ADT for a polygon with a parameter that specifies the number of sides of the polygon:

CREATE ADT polygon UNDER geometry (numOfSides float);

The polygon ADT is built UNDER the geometry ADT. The operator UNDER indicates a type hierarchy. That is, the polygon ADT is a sub-type built using the super-type geometry. Each sub-type takes on the characteristics of the super-type from which it is created. Each ADT created under the geometry ADT includes all of the parameters (i.e., attributes) of the geometry ADT.

The following example illustrates an ADT for a rectangle with four parameters that reflect the four corners of the rectangle and with the rectangle ADT being built under the polygon ADT:

| CREATE ADT rectangle UNDER polygon | (xmin float, ymin float, xmax float, ymax float); |
|---|---|

The following example illustrates an ADT for a shape with five parameters, and one of the parameters mbr is of the above-defined rectangle ADT:

CREATE ADT shape (refId short, length float, area float, mbr rectangle, numOfpoints int);

The data model of an ADT is similar to that of an object in an object-oriented programming language (e.g., C++). Therefore, in the above example statements, a type hierarchy is created with geometry as the super-type and the polygon as a sub-type. Additionally, rectangle is a sub-type of polygon.

Figure 4:
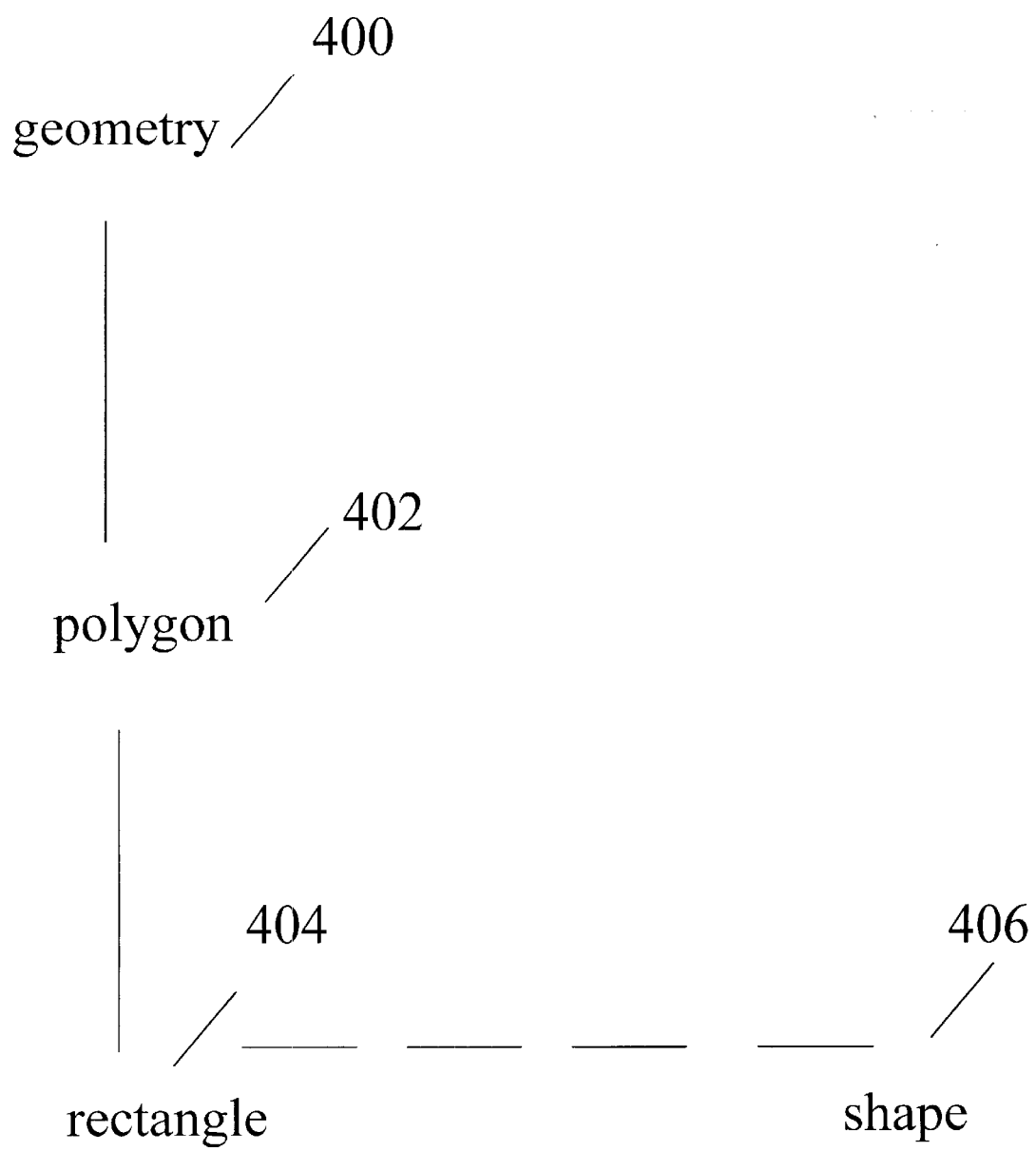
FIG. 4 illustrates relationships between super-types and sub-types.

FIG. 4 illustrates the relationships between the types. The geometry super-type 900 has a sub-type polygon 902, which in turn has a sub-type rectangle 904. The rectangle type 904 is encapsulated within the shape type 906.

Once ADTs are built, a column of a table can be defined to contain that type of data. The following is an example of a table containing a column that holds data of type geometry and a column holding data of type polygon:

| | |
|---|---|
| CREATE TABLE customers | (cid int,<br>income float,<br>. . .<br>location geometry LENGTH 100,<br>zone polygon LENGTH 1000); |

The CREATE TABLE statement creates a table named "customers" with the following columns: "cid" of type integer, "income" of type float, "location" of type geometry, and "zone" of type polygon. The ellipses indicate that other columns may exist for the customers table.

ADT Functions

For each ADT created by a user, a set of methods (i.e., user-defined functions (UDFs)) are automatically created by the compiler for processing ADT values. The methods include constructors, copy constructors, observers, and mutators.

One constructor method exists for each ADT. The constructor method has no input arguments, but returns an instance of the ADT, with all of its attributes initialized to NULL. For example, for the "geometry" ADT, the constructor method returns an instance of "geometry", with all of its attributes initialized to NULL. The following example illustrates use of the constructor method:

geometry ( )->geometry

A copy constructor method exists for each ADT. The copy constructor method takes an instance of an ADT and returns as its output a new copy of the input argument (i.e., a copy of the instance). For example, for the "geometry" instance, a copy constructor method would generate another instance of the "geometry" instance. The following example illustrates use of the copy constructor method:

copy(geometry)->geometry

An observer method exists for each attribute of an ADT. An observer method takes an ADT instance as input and returns the value of the corresponding attribute as the output. For example, for the "geometry" ADT, five observer methods are generated as shown below, one for each attribute of the "geometry" ADT:

gtype(geometry)->char
area(geometry)->float
length(geometry)->float
xmin(geometry)->float
ymin(geometry)->float
xmax(geometry)->float
ymax(geometry)->float
numOfParts(geometry)->int,
numOfPoints(geometry)->int,
points(geometry)->blob;

One mutator method exists for each attribute of an ADT. A mutator method takes an ADT instance and a new value as input and returns as its output the same ADT instance with the corresponding attribute being "mutated" or changed by the new value. For example, for the "geometry" instance, five methods are generated as shown below, one for each attribute of the "geometry" instance:

gtype(geometry, char)->geometry
area(geometry, float)->geometry
length(geometry, float)->geometry
xmin(geometry, float)->geometry
ymin(geometry, float)->geometry
xmax(geometry, float)->geometry
ymax(geometry, float)->geometry
numOfParts(geometry, int)->geometry
numOfPoints(geometry, int)->geometry
points(geometry, blob)->geometry Compile-time Processing There are eight categories of ADT methods, which are as follows: construct, copy, observe base, observe ADT, observer LOB, mutate base mutate ADT, and mutate for each ADT. The constructor, copy, observer, and mutator methods are generated specifically for each ADT, and so there could be many specific methods, each with different attributes. For compile-time processing, the embedded storage mechanism generates generic constructor, copy, observer and mutator methods that can handle any number of attributes. Then, the embedded storage mechanism maps the specific methods to the generic methods. That is, the embedded storage mechanism unifies methods of the same category in the function encapsulation phase. For each category, the embedded storage mechanism introduces new built-in function for unification. In this manner, the embedded storage mechanism supports a wide range of functions with a few generic functions.

Moreover, the embedded storage mechanism determines how the invocation of the compiler-generated methods can be represented internally. The embedded storage mechanism determines how to generate threaded code for these compiler-generated methods. Furthermore, the embedded storage mechanism determines how mutation anomaly can be avoided without sacrificing performance.

Compiler-generated ADT methods are UDFs from both the external point of view and from the catalog representation point of view of the RDBMS. Therefore, the semantic processing for the invocation of ADT methods goes through the PID construction phase, the function resolution phase, and the function encapsulation phase, as an ordinary UDF does. However, in terms of the execution of the method, ADT methods are different from ordinary UDFs. For ADT methods, the body of the function is built inside of the database engine. On the other hand, for a UDF, logic is provided by the creator of the UDF.

FIGS. 5–12 illustrate the processing performed to map specific methods to generic methods.

Figure 5:
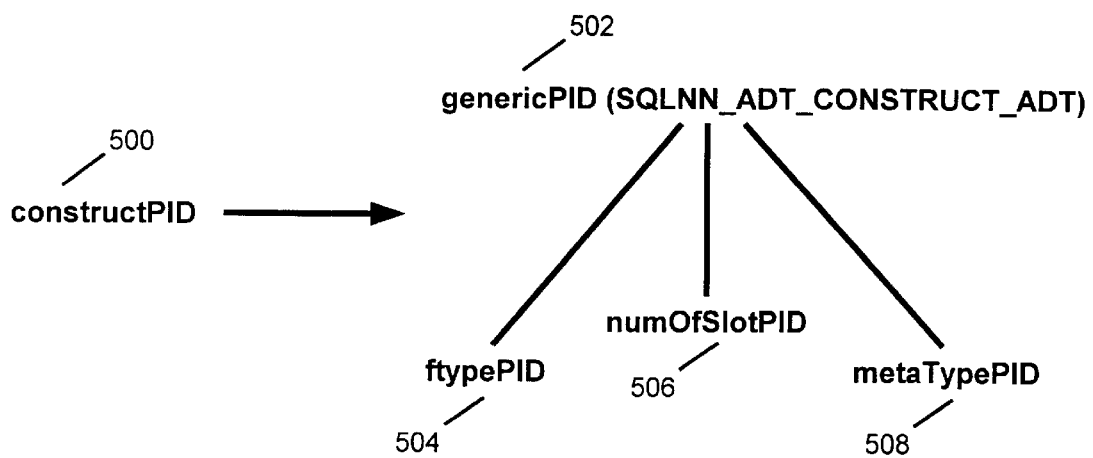
FIG. 5 is a block diagram illustrating compile-time processing of a constructor method invocation.

FIG. 5 is a block diagram illustrating compile-time processing of a constructor method invocation:

Construct (SQLNN_ADT_CONSTRUCT_ADT)

All of the ADT constructors, regardless of the ADT type, fall into this category. "SQLNN_ADT_CONSTRUCT_ADT" is an internal function identifier. The constructor method, represented as constructPID 500, is a parse tree node. Because a constructor method does not require any inputs, the node 500 has no children. ConstructPID corresponds to an expression that represents the original function invocation (e.g., geometry ( )).

The embedded storage mechanism maps the specific function (e.g., geometry ( )) to a generic function, genericPID 502, by generating a new parse tree, with genericPID 502 as the root node. The child nodes of genericPID 502 are used to store information about the original constructor function. The node ftypePID 504 indicates the type of constructor (e.g., geometry). The node numOfSlotPID 506 specifies the number of slots to allocate for the attributes of the type (e.g., as discussed above, the geometry type has 11 attributes, which require 11 slots). The number of slots will be discussed below with reference to self-referencing pointers and meta-data. The node metaTypePID describes each attribute of the ADT (e.g., geometry).

Figure 6:
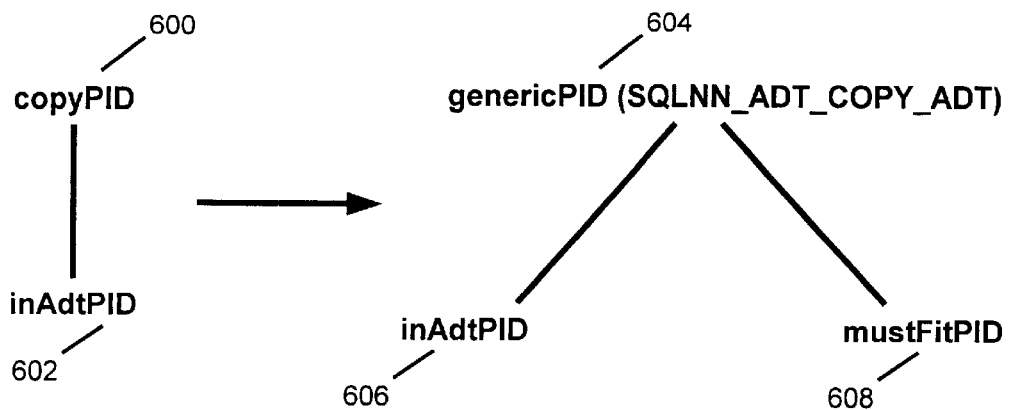
FIG. 6 is a block diagram illustrating compile-time processing of a copy constructor method invocation.

FIG. 6 is a block diagram illustrating compile-time processing of a copy constructor method invocation:

Copy (SQLNN_ADT_COPY_ADT)

All of the ADT copy constructors, regardless of the ADT type, fall into this category. SQLNN_ADT_COPY_ADT is an internal function identifier. The copy constructor method, represented as copyPID 600, is a parse tree node. Because a copy constructor method takes an instance of an ADT as input, the node inAdtPID 602 is used to hold information about the input of the original copy constructor invocation (e.g., copy(geometry)).

The embedded storage mechanism maps the specific function (e.g., copy(geometry)) to a generic function, genericPID 604, by generating a new parse tree, with genericPID 604 as the root node. The child nodes of genericPID 604 are used to store information about the original copy constructor function. The node inAdtPID 606 holds information for the instance of the ADT input to the copy constructor. The node mustFitPID 608 indicates whether memory for holding a copy should be allocated at compile-time (i.e., when a mustfit flag is TRUE) or at run-time (i.e., when a mustfit flag is FALSE), indicates the type of copy constructor (e.g., geometry).

Figure 7:
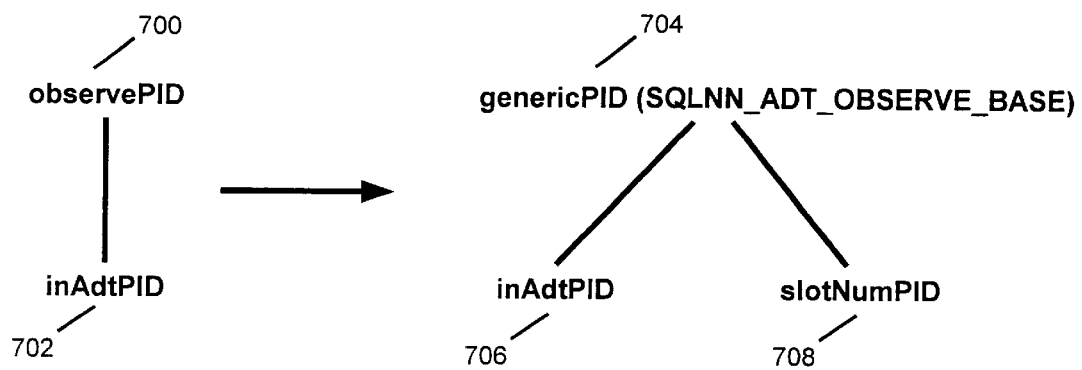
FIG. 7 is a block diagram illustrating compile-time processing of an observer base method invocation.

FIG. 7 is a block diagram illustrating compile-time processing of an observer base method invocation:

Observer base (SQLNN_ADT_OBSERVE_BASE)

All of the ADT observers for base-typed attributes, regardless of the specific attribute type, fall into this category. SQLNN_ADT_OBSERVE_BASE is an internal function identifier. The observer base method, represented as observePID 700, is a parse tree node. Because an observer base method takes an instance of an ADT as input, the node inAdtPID 702 is used to hold information about the input of the original observer base invocation (e.g., area(geometry)).

The embedded storage mechanism maps the specific function (e.g., area(geometry)) to a generic function, genericPID 704, by generating a new parse tree, with genericPID 704 as the root node. The child nodes of genericPID 704 are used to store information about the original observer base method. The node inAdtPID 706 holds information for the instance of the ADT input to the observer base method. The node slotNumPID 708 specifies the position of the attribute (e.g., area) of the type (e.g., geometry) that is to be observed by specifying the slot in which that information would be referenced.

Figure 8:
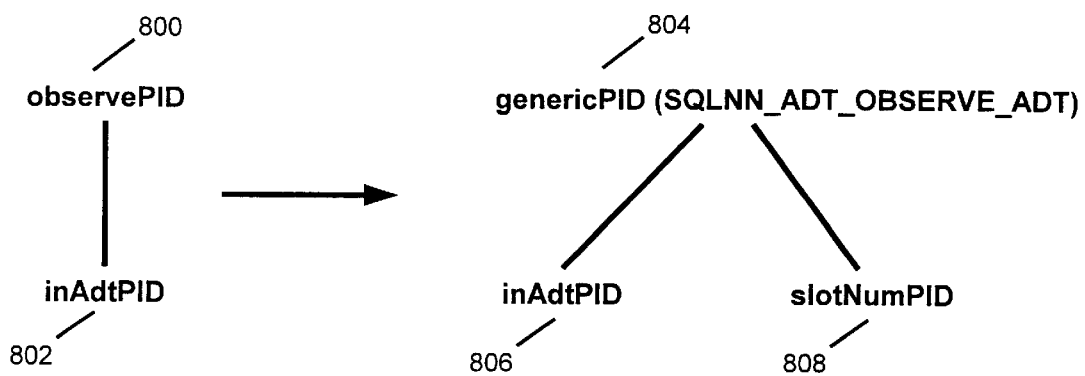
FIG. 8 is a block diagram illustrating compile-time processing of an observer ADT method invocation.

FIG. 8 is a block diagram illustrating compile-time processing of an observer ADT method invocation:

Observer ADT (SQLNN_ADT_OBSERVE_ADT)

All of the ADT observers for ADT-typed attributes, regardless of the specific attribute type, fall into this category. SQLNN_ADT_OBSERVE_ADT is an internal function identifier. The observer ADT method, represented as observePID 800, is a parse tree node. Because an observer ADT method takes an instance of an ADT as input, the node inAdtPID 802 is used to hold information about the input of the original observer ADT invocation.

The embedded storage mechanism maps the specific function to a generic function, genericPID 804, by generating a new parse tree, with genericPID 804 as the root node. The child nodes of genericPID 804 are used to store information about the original observer ADT method. The node inAdtPID 806 holds information for the instance of the ADT input to the observer ADT method. The node slotNumPID 808 specifies the position of the attribute of the type that is to be observed by specifying the slot in which that information would be referenced.

Figure 9:
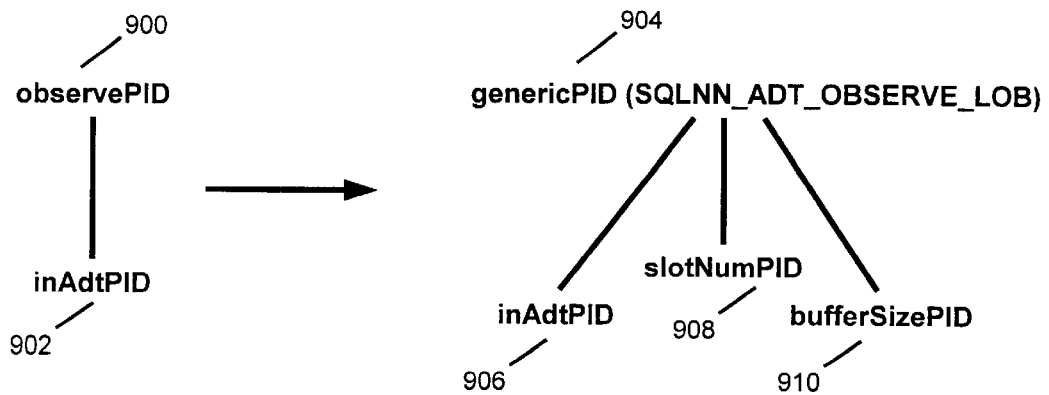
FIG. 9 is a block diagram illustrating compile-time processing of an observer LOB method invocation.

FIG. 9 is a block diagram illustrating compile-time processing of an observer LOB method invocation:

Observer LOB (SQLNN_ADT_OBSERVE_LOB)

All of the ADT observers for LOB-typed attributes, regardless of the specific attribute type, fall into this category. SQLNN_ADT_OBSERVE_LOB is an internal function identifier. The observer LOB method, represented as observePID 900, is a parse tree node. Because an observer LOB method takes an instance of an ADT as input, the node inAdtPID 902 is used to hold information about the input of the original observer LOB invocation (e.g., points (geometry)).

The embedded storage mechanism maps the specific function (e.g., points(geometry)) to a generic function, genericPID 904, by generating a new parse tree, with genericPID 904 as the root node. The child nodes of genericPID 904 are used to store information about the original observer LOB method. The node inAdtPID 906 holds information for the instance of the ADT input to the observer LOB method. The node slotNumPID 908 specifies the position of the attribute (e.g., points) of the type (e.g., geometry) that is to be observed by specifying the slot in which that information would be referenced. The node buffersizePID 910 indicates how spaces needs to be allocated for the LOB at run-time.

Figure 10:
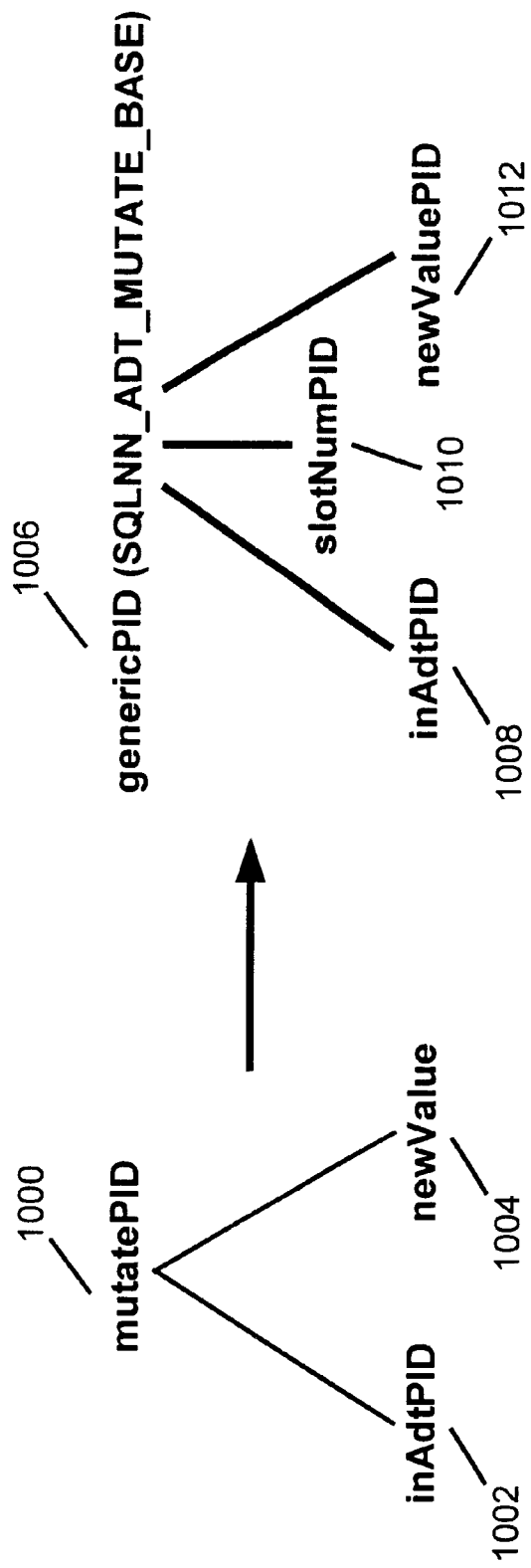
FIG. 10 is a block diagram illustrating compile-time processing of a mutate base method invocation.

FIG. 10 is a block diagram illustrating compile-time processing of a mutate base method invocation:

Mutate base (SQLNN_ADT_MUTATE_BASE)

All of the ADT mutators for base-typed attributes, regardless of the specific attribute type, fall into this category. SQLNN_ADT_MUTATE_BASE is an internal function identifier. The mutator base method, represented as mutatePID 1000, is a parse tree node. Because a mutator base method takes an instance of an ADT and a new value as input, the node inAdtPID 1002 is used to hold information about the ADT instance and the node newValue 1004 is used to hold the new value.

The embedded storage mechanism maps the specific function (e.g., area (geometry, float)) to a generic function, genericPID 1006, by generating a new parse tree, with genericPID 1006 as the root node. The child nodes of genericPID 1006 are used to store information about the original mutator base method. The node inAdtPID 1008 holds information for the instance of the ADT input to the mutator base method. The node slotNumPID 1010 specifies the position of the attribute (e.g., area) of the type (e.g., geometry) that is to be mutated by specifying the slot in which that information would be referenced. The newValuePID 1012 holds the new value.

Figure 11:
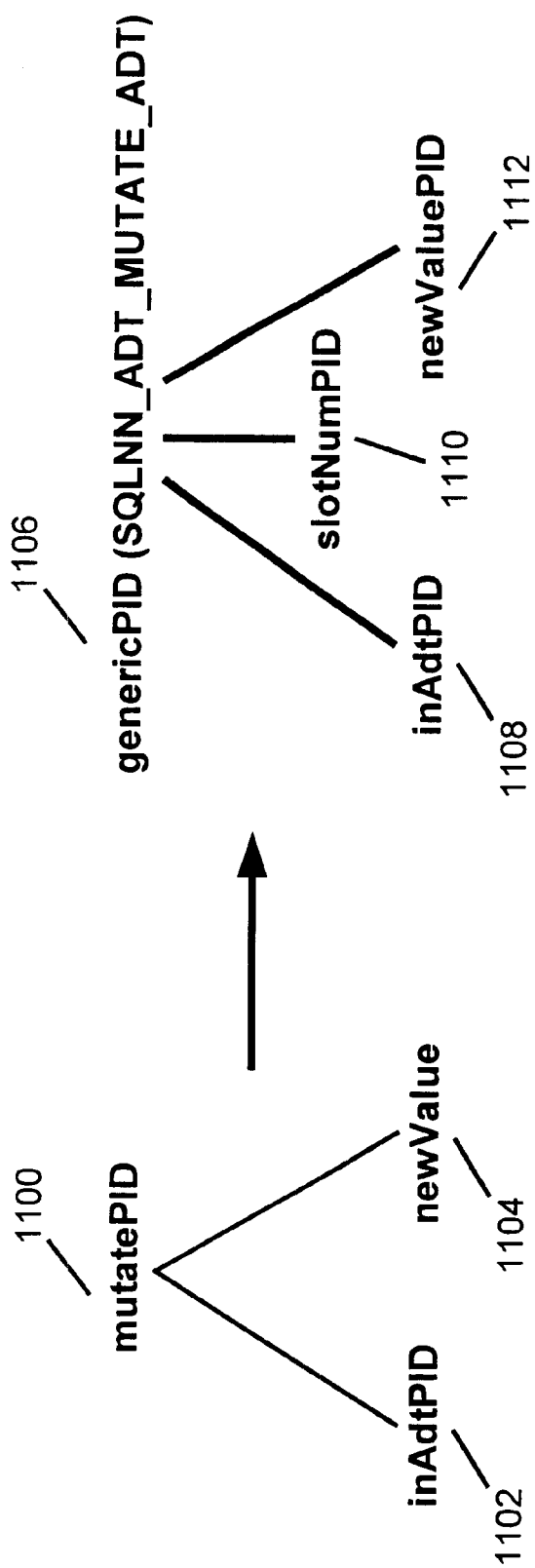
FIG. 11 is a block diagram illustrating compile-time processing of a mutate ADT method invocation.

FIG. 11 is a block diagram illustrating compile-time processing of a mutate ADT method invocation:

Mutate ADT (SQLNN_ADT_MUTATE_ADT)

All of the ADT mutators for ADT-typed attributes, regardless of the specific attribute type, fall into this category. SQLNN_ADT_MUTATE_ADT is an internal function identifier. The mutator ADT method, represented as mutatePID 1100, is a parse tree node. Because a mutator ADT method takes an instance of an ADT and a new value as input, the node inAdtPID 1102 is used to hold information about the ADT instance and the node newValue 1104 is used to hold the new value.

The embedded storage mechanism maps the specific function to a generic function, genericPID 1106, by generating a new parse tree, with genericPID 1106 as the root node. The child nodes of genericPID 1106 are used to store information about the original mutator ADT method. The node inAdtPID 1108 holds information for the instance of the ADT input to the mutator ADT method. The node slotNumPID 1110 specifies the position of the attribute of the type that is to be mutated by specifying the slot in which that information would be referenced. The newValuePID 1112 holds the new value.

Figure 12:
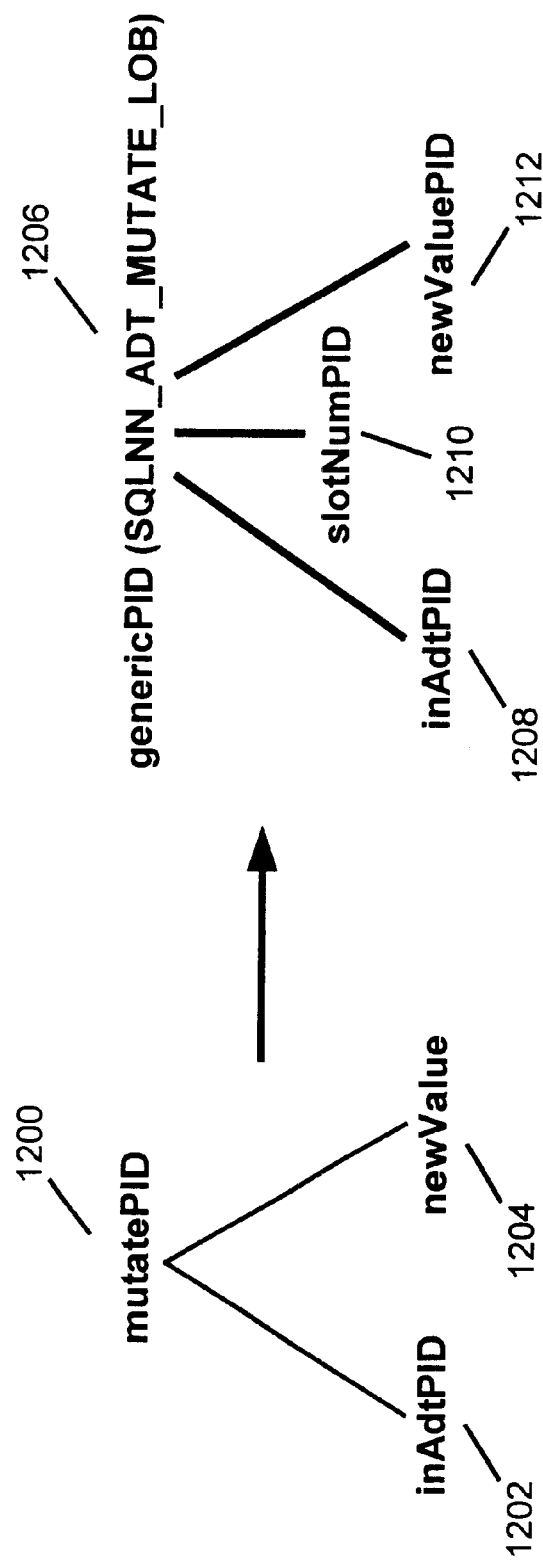
FIG. 12 is a block diagram illustrating compile-time processing of a mutate LOB method invocation.

FIG. 12 is a block diagram illustrating compile-time processing of a mutate LOB method invocation:

Mutate LOB (SQLNN_ADT_MUTATE_LOB)

All of the ADT mutators for LOB-typed attributes, regardless of the specific attribute type, fall into this category. SQLNN_ADT_MUTATE_LOB is an internal function identifier. The mutator LOB method, represented as mutatePID 1200, is a parse tree node. Because a mutator LOB method takes an instance of an ADT and a new value as input, the node inAdtPID 1202 is used to hold information about the ADT instance and the node newValue 1204 is used to hold the new value.

The embedded storage mechanism maps the specific function (e.g., points (geometry, blob)) to a generic function, genericPID 1206, by generating a new parse tree, with genericPID 1206 as the root node. The child nodes of genericPID 1206 are used to store information about the original mutator LOB method. The node inAdtPID 1208 holds information for the instance of the ADT input to the mutator LOB method. The node slotNumPID 1210 specifies the position of the attribute (e.g., points) of the type (e.g., geometry) that is to be observed by specifying the slot in which that information would be referenced. The newValuePID 1212 holds the new value.

The code generator of the embedded storage mechanism generates a one-byte buffer for the result of the SQLNN_ADT_MUTATE_XXX and the SQLNN_ADT_OBSERVE_ADT function invocations, regardless of the length stored in the parse tree. This is done because the result buffer for the above functions is not used by the RDS run-time routine.

RDS Run-time Processing

For RDS run-time processing, the embedded storage mechanism determines the in-memory representation of an ADT instance. Additionally, the embedded storage mechanism determines how memory allocated on behalf an ADT (i.e., for constructor, copy, observer, and mutator methods) is to be managed. Also, the embedded storage mechanism evaluates these compiler-generated methods efficiently in memory.

Figure 13:
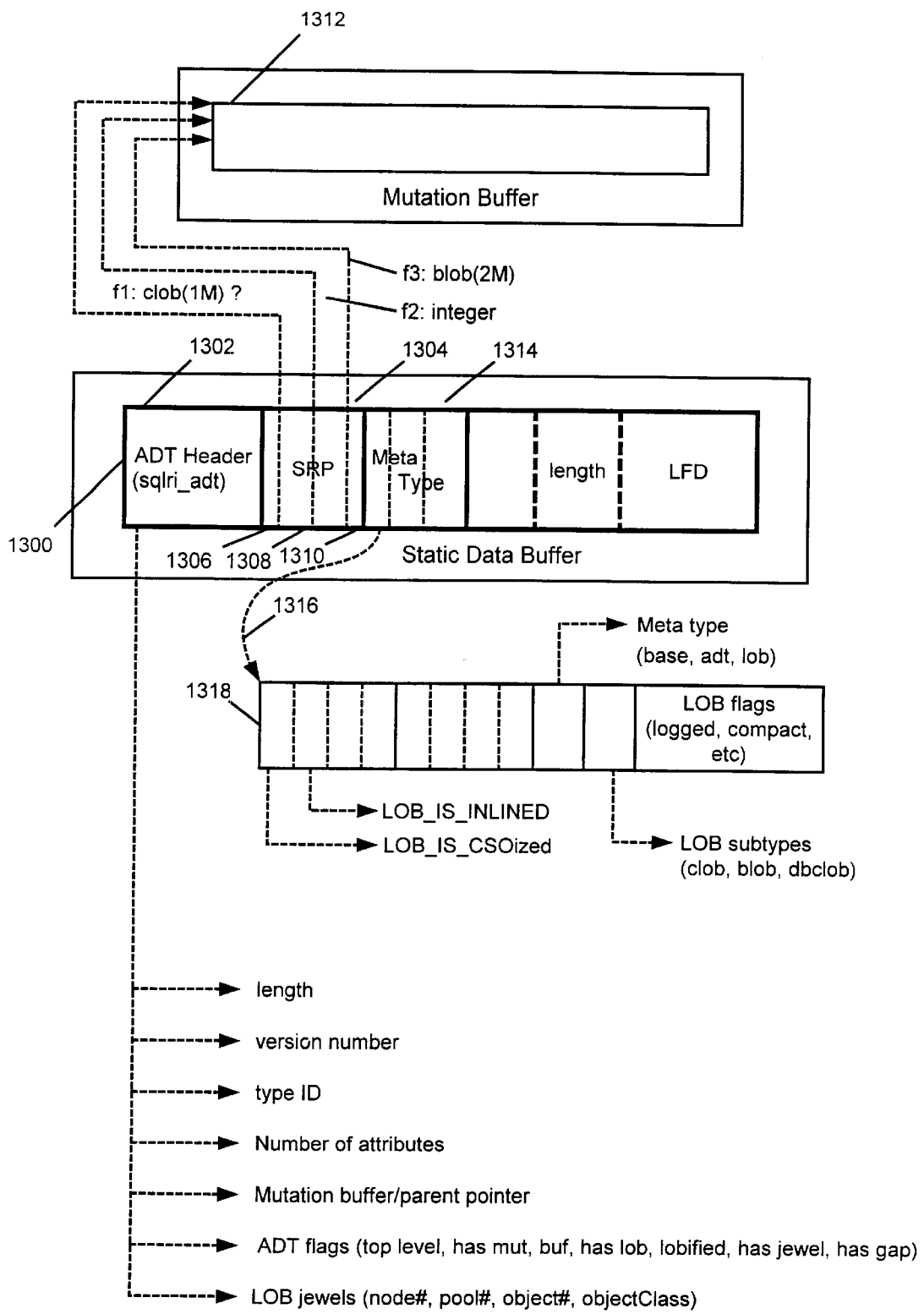
FIG. 13 is a block diagram illustrating an in-memory representation of an ADT structure.

FIG. 13 is a block diagram illustrating an in-memory representation of an ADT structure 1300. The ADT structure 1300 is built for an ADT, called, for example, newADT, with three attributes, a character large object (CLOB) "f1", an integer "f2", and a binary large object (BLOB) "f3". The ADT structure 1300 contains an ADT header 1302. The ADT header contains information about the ADT including the following information:

Length of the ADT.

Version number of the ADT, which is useful when an ADT is modified, and different users require the old and new versions.

Type ID, which provides the type of the ADT, for example, shape or point.

Number of attributes (e.g., the ADT in FIG. 13 has three attributes).

Mutation buffer/Parent pointer. If an attribute is a not a sub-type, then the ADT structure 1300 contains a pointer to the mutation buffer containing the data values for that attribute. If the attribute is a sub-type, then, the ADT structure 1300 contains a pointer to the parent ADT structure.

ADT flags provide additional information about the ADT. For example, "top level" indicates whether the ADT itself is an attribute of another ADT; "has mut. buf." indicates whether a mutation buffer exists; "has LOB" indicates whether the ADT has a LOB that may need to be cleaned up or processed; "lobified" indicates whether the ADT has been converted into a LOB, in which case the header of the ADT is put into the record buffer and the rest of the ADT is referenced with a LOB descriptor stored in the record buffer; "has jewel" indicates whether a directory exists indicating the location of information that is stored in a LOB; "has gap" indicates whether there is a gap.

LOB jewels provide the directory indicating the location of information referenced by a LOB descriptor. LOB jewels may include node#, pool#, object#, and objectClass.

The ADT Structure 1302 also contains a self-referencing pointer (SRP) array 1304 with an element for each attribute. For attribute "f1", the SRP array 1304 contains an entry 1306 that points to a mutation buffer 1312. For attribute "f2", the SRP array 1304 contains an entry 1308 that points to the mutation buffer 1312. For attribute "f3", the SRP array 1304 contains an entry 1310 that points to the mutation buffer 1312.

The ADT Structure 1302 contains a meta type array 1314 with an element for each attribute. For example, FIG. 13 illustrates that for attribute "f1", the meta type array 1314 includes a pointer 1316 to additional data 1318. The additional data includes an indication of whether data is in-lined and of the LOB sub-type (e.g., CLOB or BLOB). Although not illustrated in FIG. 13, the meta type array 1314 could contain pointers to additional data for attributes "f2" and "f3".

The following method invocations will be used to illustrate the creation of the in-memory representation:

newADT( )

f1(newADT, clobx)

f2(newADT, inty)

f3(newADT, blobz)

Initially, the embedded storage mechanism processes the newADT( ) method to generate an empty in-memory structure of newADT. In particular, information about the slots for the SRP array 1304 and the meta type array 1314 is obtained from the numofSlots node of the parse tree generated while mapping a specific constructor method for newADT to a generic method.

The f1(newADT, clobx) method adds data into the empty ADT structure for f1. From the parse tree generated for the mutator method for newADT, the embedded storage mechanism obtains the input ADT, the position (i.e., slot number) of the attribute f1 in the ADT, and the new value. Initially, the embedded storage mechanism allocates the mutation buffer. The embedded storage mechanism then anchors the mutation buffer to the ADT with a pointer from the SRP array to the mutation buffer. The embedded storage mechanism allocates an mutation buffer that is large than the buffer required for f1, and this enables the mutation buffer to also add information for other attributes of newADT, such as f2 and f3, to the buffer at a later time. After allocating the mutation buffer, the embedded storage mechanism suballocates a portion of the mutation buffer to f1 and stores the value of f1 in that portion. By using a mutation buffer at run-time, the embedded storage mechanism avoids having to limit the buffer size at compile-time.

DMS Run-time Processing

For DMS run-time processing, the embedded storage mechanism determines the format of an ADT instance in the record buffer through a process called linearization.

Figure 14:
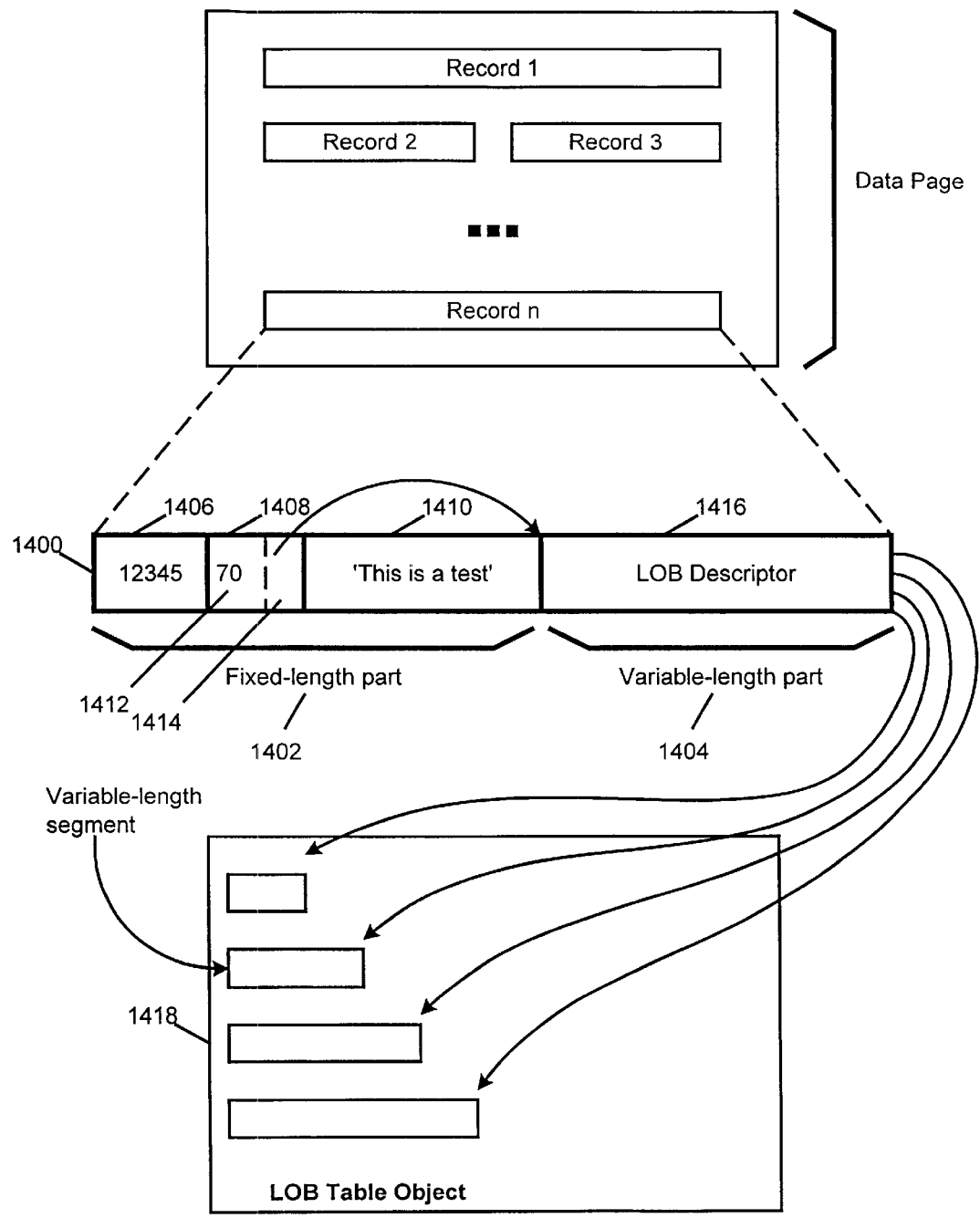
FIG. 14 is a diagram illustrating a record buffer.

FIG. 14 is a diagram illustrating a record buffer. A record buffer contains values for each column of a tuple. Record 1400 represents a tuple in a table created using the following query:

CREATE TABLE tb1 (c1 INT, c2 BLOB(1M), c3 CHAR (15));

The "tb1" table has three columns, with an attribute "c1" representing an integer, an attribute "c2" representing a binary large object, and an attribute "c3" representing a fixed-length character string that can have a maximum of 15 characters. A record 1400 includes a fixed-length part 1402 and a variable-length part 1404. The fixed-length part includes the data value 1406 for attribute "c1", a length/pointer portion 1408 for describing the location of the BLOB object, "c2", and a data value 1410 for attribute "c3". The length/pointer portion 1408 includes a length 1412 of a LOB descriptor 1416 and a pointer 1414 to the LOB descriptor 1416. The LOB descriptor 1416 is stored in the variable-length part 1404 of the record 1400. The LOB descriptor 1416 maps to the location in memory of the large object. The LOB descriptor 1416 is stored in the record buffer 1416, while the LOB object data is stored in a LOB table object 1418. The LOB object has no page limitation. The LOB object is actually stored in variable-length segments 1418.

The record buffer is a linear structure. However, the in-memory representation illustrated in FIG. 13 is not in a linear format. Therefore, the embedded storage mechanism must process the in-memory representation into a format that can be placed into the record buffer.

Figure 15:
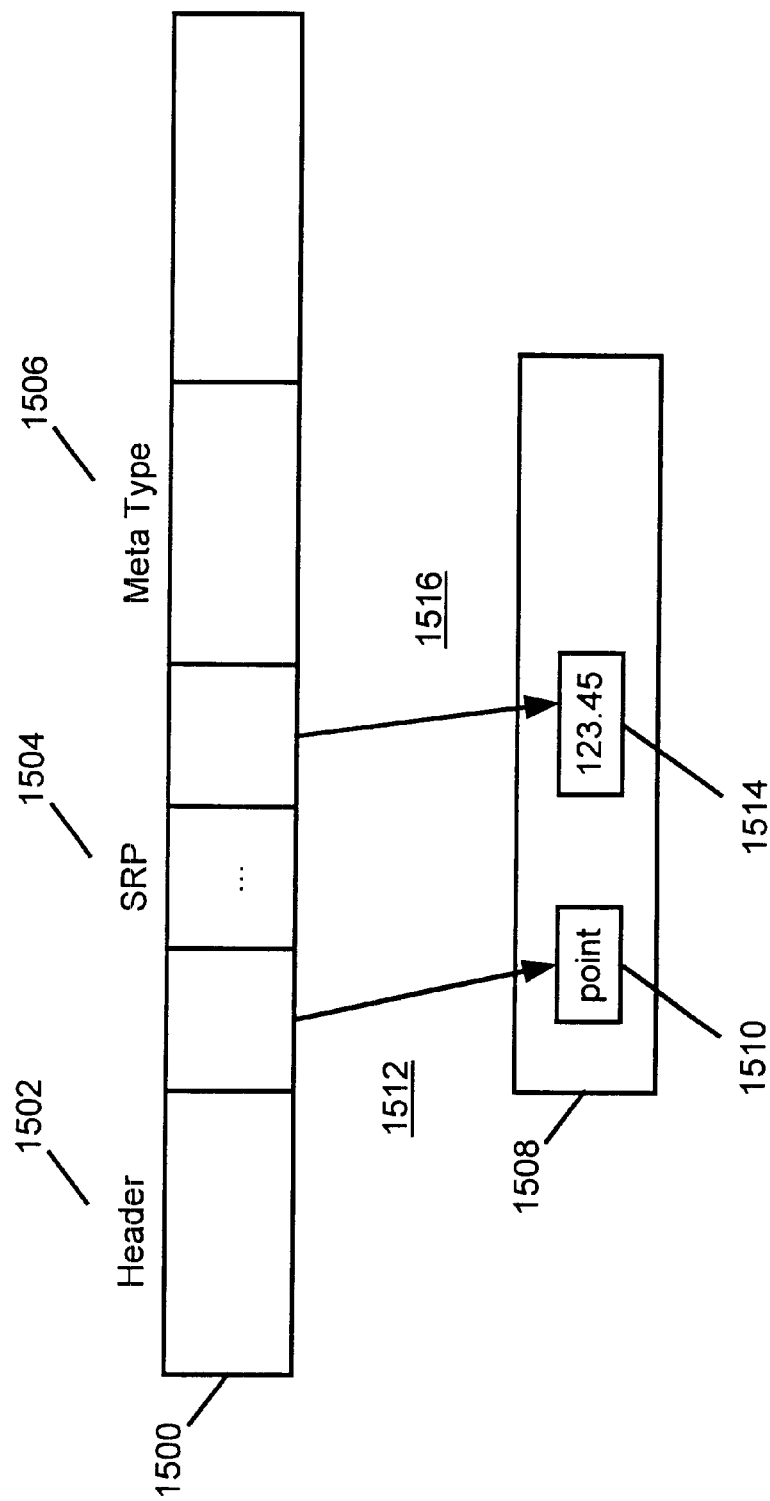
FIG. 15 illustrates an example of creating an in-memory representation of an ADT structure.
Figure 16:
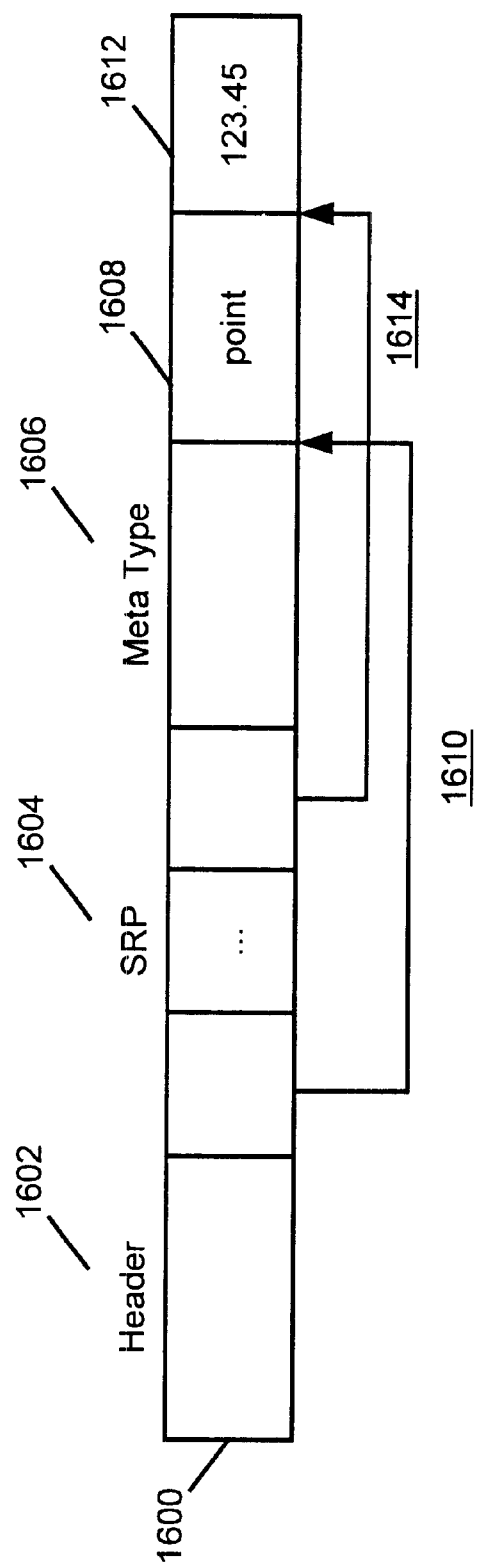
FIG. 16 illustrates the results of the embedded storage mechanism storing the ADT data in a linear format that can then be placed into the record buffer.

FIGS. 15–16 illustrate the linearization process. FIG. 15 illustrates an example of creating an in-memory representation of an ADT structure. The following SQL statement creates and adds data to the ADT structure:

INSERT INTO customers(location) values
point ( ) . . . gtype ('point') . . . area (123.45)

The INSERT statement attempts to insert data into the "location" column of a "customers" table. The "location" column is of a "point" ADT type with attributes "gtype" and "area". Initially, for "point ( )", an ADT structure with a header, SRP array, and meta type array is generated, with NULL values, for the "point" ADT structure. For example, in FIG. 15, the ADT structure 1500 is created with a header 1502, SRP array 1504, and meta type array 1506.

At run-time, when actual data is being added into the ADT, a mutation buffer 1508 is generated. The mutation buffer 1508 is created when the "gtype ('point')" is evaluated to "mutate" (e.g., add or update) data. After the mutation buffer 1508 is created, the 'point' value 1510 for the "gtype" attribute is added to the mutation buffer 1508. Then, a self-referencing pointer 1512 from the ADT structure 1500 is set to point to the data value 1510.

When the value for the "area" attribute is to be added, since the mutation buffer 1508 is already created, the data value '123.45' 1514 is added to the mutation buffer 1508. Then, a self-referencing pointer 1516 from the ADT structure 1500 is set to point to the data value 1514. The ellipses in the SRP array 1504 indicate that other elements may exist for other attributes of the "point" ADT.

The same storage mechanism is used for an ADT stricture that has an ADT structure as an attribute or that contains sub-types.

Once the ADT structure is created in memory, the embedded storage mechanism manipulates the ADT structure to store the ADT structure into a record buffer with linearization. Generally, starting with a top-level ADT, for each SRP array entry in the in-memory representation, the pointer is followed to the mutation buffer to obtain data. If the data is a base type, the data is copied after the meta type data. If the data is a LOB type, the LOB data is written to a LOB object and a LOB descriptor is generated. The LOB descriptor is copied after the meta type data. Furthermore, nested ADTs are handled with recursion.

FIG. 16 illustrates the results of the embedded storage mechanism storing the ADT data in a linear format that can then be placed into the record buffer. For linearization, the embedded storage mechanism initially copies the header 1602 of the ADT structure into the record buffer 1600. Then, the embedded storage mechanism follows each pointer of the SRP to obtain data to copy into the record buffer 1600. For example, for the self-referencing pointer 1512, the embedded storage mechanism obtains data value 1510 and stores this as 'point' 1610 in the record buffer 1600. Then, the embedded storage mechanism adjusts the pointer 1612 of the SRP 1604 in the record buffer 1600 to point to the data value 1610. Next, for the self-referencing pointer 1516, the embedded storage mechanism obtains data value 1514 and stores this as '123.45' 1614 in the record buffer 1600. Then, the embedded storage mechanism adjusts the pointer 1612 of the SRP 1604 in the record buffer 1600 to point to the data value 1610.

Once the ADT data is in a linear format, the format for placing the data into the record buffer is determined with respect to the following issues: LOB attributes of ADTs, lobification of ADTs, and in-lining LOB attributes of ADTs. For LOB attributes, if the attributes can fit into the record buffer, they are stored there. If LOB attributes cannot fit into the record buffer, the embedded storage mechanism uses a process called lobification to store a descriptor to a LOB in the record buffer, with the descriptor indicating the location of the LOB. That is, the embedded storage mechanism handles a LOB by using a LOB jewel in the header to locate the storage location of the LOB and places the LOB descriptor into the record buffer. Additionally, a process called in-lining is used to determine whether to store data in-line (i.e., within the record buffer) or in a LOB.

Once the record buffer is generated, the following SQL statement could be used to retrieve data:

SELECT location . . . gtype, location . . . area FROM customers

The above select statement selects the 'point' and '123.45' data values that have been stored as attributes of the location ADT in the "customers" table.

Flow Diagrams

Figure 17:
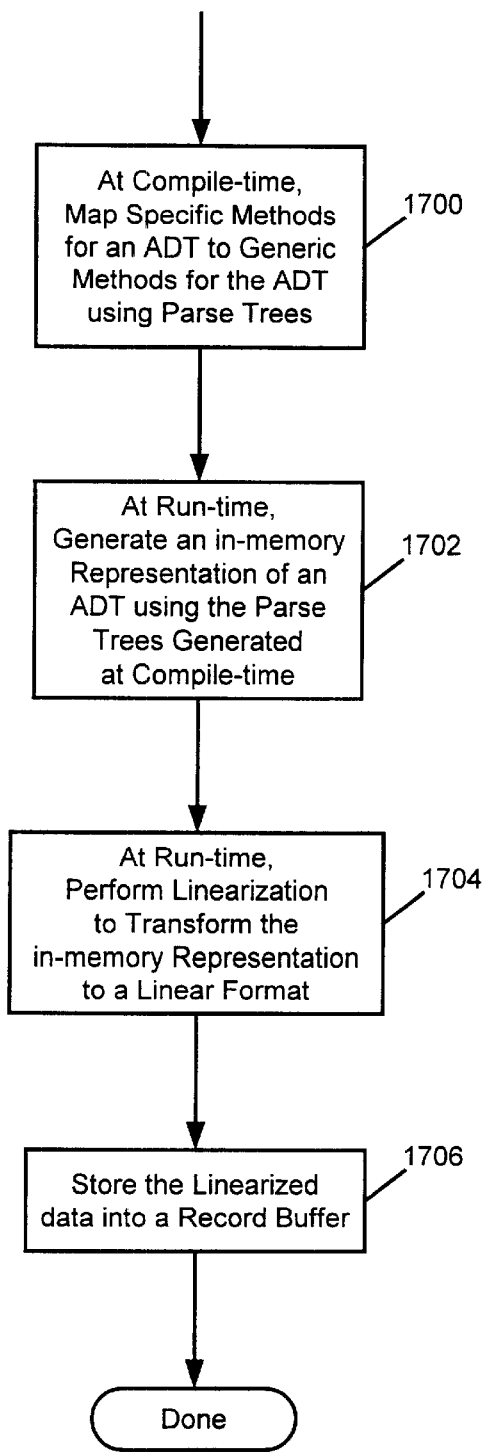
FIG. 17 is a flow diagram illustrating the steps performed by the embedded storage mechanism.

FIG. 17 is a flow diagram illustrating the steps performed by the embedded storage mechanism. In block 1700, at compile-time, the embedded storage mechanism maps specific methods for an ADT to generic methods for the ADT using parse trees. In Block 1702, at run-time, the embedded storage mechanism generates an in-memory representation of the ADT using the parse trees generated at compile-time. In Block 1704, at run-time, the embedded storage mechanism performs linearization to transform the in-memory representation to a linear format for storing in a record buffer. In Block 1706, the embedded storage mechanism stores the linearized data into a record buffer.

Figure 18:
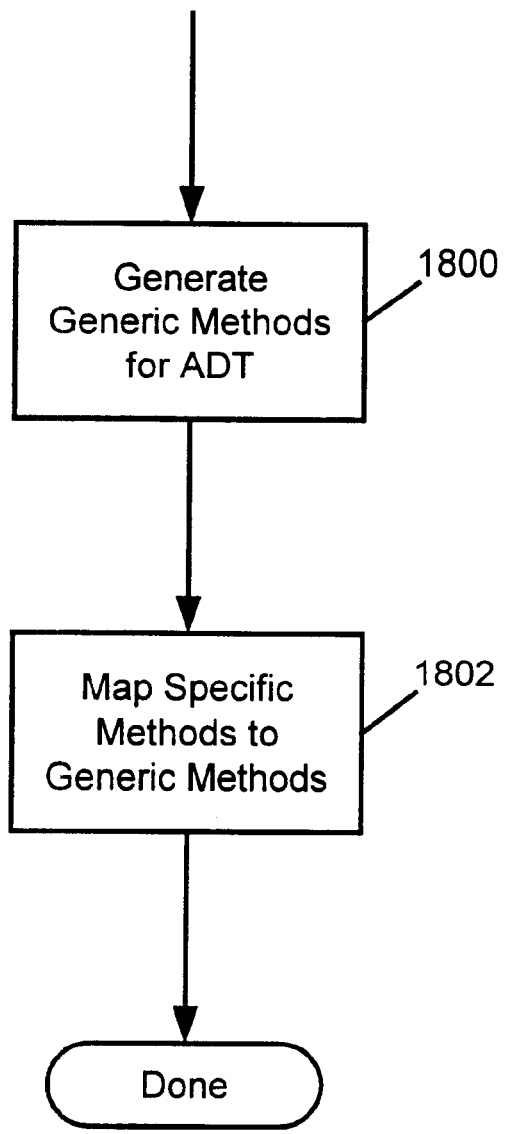
FIG. 18 is a flow diagram illustrating the steps performed by the embedded storage mechanism during compile-time.

FIG. 18 is a flow diagram illustrating the steps performed by the embedded storage mechanism during compile-time. In Block 1800, the embedded storage mechanism generates generic methods for each ADT. In Block 1802, the embedded storage mechanism maps specific methods to generic methods for each ADT.

Figure 19:
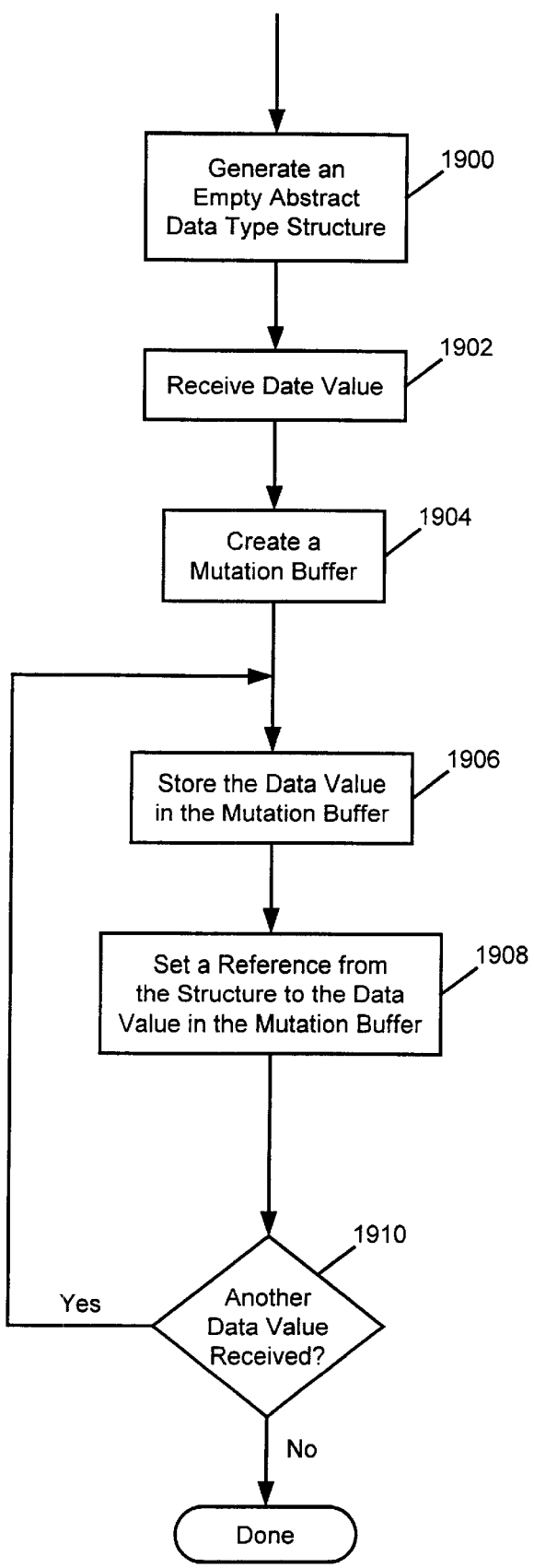
FIG. 19 is a flow diagram illustrating the steps performed by the embedded storage mechanism at run-time to generate an in-memory representation of an ADT.

FIG. 19 is a flow diagram illustrating the steps performed by the embedded storage mechanism at run-time to generate an in-memory representation of an ADT. In Block 1900, the embedded storage mechanism generates an empty abstract data type (ADT) structure. In Block 1902, the embedded storage mechanism receives a data value. At this time, this is the first data value to be received for the empty ADT. Therefore, in Block 1904, the embedded storage mechanism creates a mutation buffer. In Block 1906, the embedded storage mechanism stores the data value in the mutation buffer. In Block 1908, the embedded storage mechanism sets a pointer from the ADT structure to the data value in the mutation buffer. In Block 1910, the embedded storage mechanism determines whether another data value has been received. If another data value has been received, the embedded storage mechanism continues to loop back to Block 1906 to process the data value, otherwise, the embedded storage mechanism is done.

Figure 20:
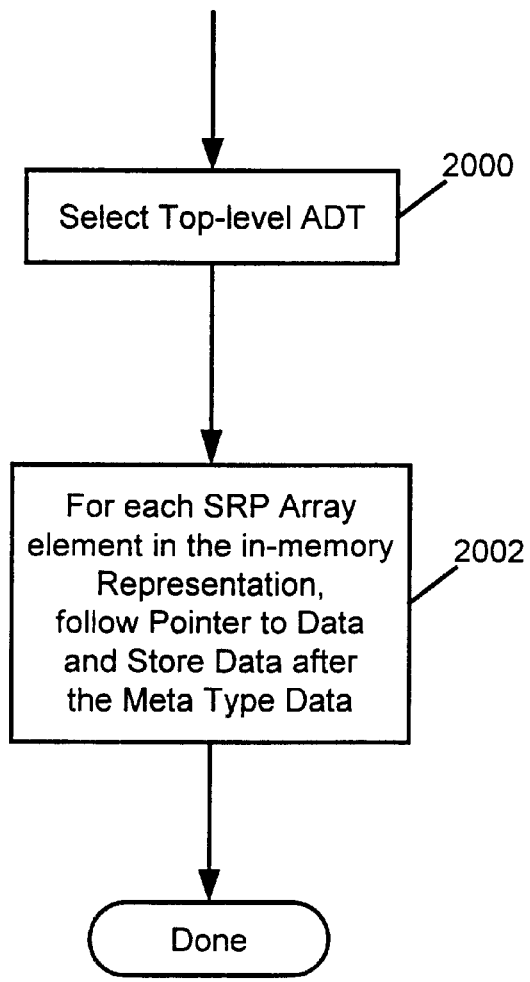
FIG. 20 is a flow diagram illustrating the steps performed by the embedded storage mechanism at run-time to perform linearization.

FIG. 20 is a flow diagram illustrating the steps performed by the embedded storage mechanism at run-time to perform linearization. In Block 2000, the embedded storage mechanism selects the top-level ADT. In Block 2002, for each SRP array element in the in-memory representation, the embedded storage mechanism, follows the pointer to data and stores the data after the meta data, either directly (i.e., for base types) or as a LOB descriptor (i.e., for LOB types).

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented embedded storage mechanism for structured data types. The present invention provides substitutability for columns defined with structured data types. Additionally, the present invention provides extensibility of a type hierarchy.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of processing a statement in a database stored on a data storage device connected to a computer, the method comprising:

at compile-time, mapping specific methods for a structured data type to generic methods using parse trees; and at run-time, generating an in-memory representation of the structured data type using information conveyed in the parse trees; and converting said in-memory representation to a linear structure.

2. The method of claim 1, further comprising, during compile-time, generating generic methods for each specific structured data type.

3. The method of claim 1, wherein the step of generating an in-memory representation, further comprises the step of creating an empty structured data type structure.

4. The method of claim 3, further comprising the steps of:

receiving data for one of the attributes of the structured data type; and creating a mutation buffer for storing the received data.

5. The method of claim 4, further comprising the step of creating a reference from the structured data type structure to the data stored in the mutation buffer.

6. The method claim of claim 1, wherein converting the generated in-memory representation to a linear structure further comprises transforming the generated in-memory representation into a linear structure that can be stored in a record buffer.

7. An apparatus for executing a statement, comprising:

a computer having a data storage device connected thereto, wherein the data storage device stores a database;

one or more computer programs, preformed by the computer, for, at compile-time, mapping specific methods for a structured data type to generic methods using parse trees and at run-time, generating an in-memory representation of the structured data type using information conveyed in the parse trees and converting the generated in-memory representation to a linear structure.

8. The apparatus of claim 7, further comprising, during compile-time, means for generating generic methods for each specific structured data type.

9. The apparatus of claim 7, wherein the means for generating an in-memory representation, further comprises the means for creating an empty structured data type structure.

10. The apparatus of claim 9, further comprising:

means for receiving data for one of the attributes of the structured data type; and means for creating a mutation buffer for storing the received data.

11. The apparatus of claim 10, further comprising the means for creating a reference from the structured data type structure to the data stored in the mutation buffer.

12. The apparatus of claim 7, wherein the means for converting the generated in-memory representation to a linear structure further comprises the means for transforming the generated in-memory representation into a linear structure that can be stored in a record buffer.

13. An article of manufacture comprising a computer program carrier readable by a computer and embodying one or more instructions executable by the computer for processing a statement in a database stored in a data storage device connected to the computer, the method comprising:

at compile-time, mapping specific methods for a structured data type to generic methods using parse trees; and at run-time, generating an in-memory representation of the structured data type using information conveyed in the parse trees; and converting the generated in-memory representation to a linear structure.

14. The article of manufacture of claim 13, further comprising, during compile-time, generating generic methods for each specific structured data type.

15. The article of manufacture of claim 13, wherein the step of generating an in-memory representation, further comprises the step of creating an empty structured data type structure.

16. The article of manufacture of claim 15, further comprising the steps of:

receiving data for one of the attributes of the structured data type; and creating a mutation buffer for storing the received data.

17. The article of manufacture of claim 16, further comprising the step of creating a reference from the structured data type structure to the data stored in the mutation buffer.

18. The article of manufacture of claim 16, wherein converting the generated in-memory representation to a linear structure further comprises transforming the generated in-memory representation into a linear structure that can be stored in a record buffer.

\* \* \* \* \*